(12) United States Patent
Teter et al.

(10) Patent No.: US 10,461,595 B2
(45) Date of Patent: Oct. 29, 2019

(54) ROTOR ASSEMBLY AND COOLING ARRANGEMENT FOR AN ELECTRIC MACHINE

(71) Applicant: GE Aviation Systems LLC, Grand Rapids, MI (US)

(72) Inventors: Joseph Kenneth Teter, Dayton, OH (US); James Patrick Mahle, Vandalia, OH (US); Winfred Dwight Koontz, Jr., Brookville, OH (US); David George Kloos, Dayton, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 268 days.

(21) Appl. No.: 14/551,102

(22) Filed: Nov. 24, 2014

(65) Prior Publication Data

US 2016/0149451 A1    May 26, 2016

(51) Int. Cl.
*H02K 9/19* (2006.01)
*H02K 3/24* (2006.01)
*H02K 9/197* (2006.01)
*H02K 1/32* (2006.01)

(52) U.S. Cl.
CPC .............. *H02K 3/24* (2013.01); *H02K 1/325* (2013.01); *H02K 9/197* (2013.01); *H02K 1/32* (2013.01)

(58) Field of Classification Search
CPC .......... H02K 3/24; H02K 1/325; H02K 9/197; H02K 1/32; H02K 1/24; H02K 9/005; H02K 9/19

USPC .... 310/52, 54, 61, 60 A, 64, 58, 262, 661.1, 310/270
See application file for complete search history.

(56) References Cited

U.S. PATENT DOCUMENTS

| | | |
|---|---|---|
| 3,189,769 A | 6/1965 | Willyoung |
| 3,462,625 A | 8/1969 | Endress |
| 5,424,593 A | 6/1995 | Vaghani et al. |
| 6,734,585 B2 | 5/2004 | Tornquist et al. |
| 6,984,910 B2 * | 1/2006 | Down ................... H02K 3/527 310/192 |
| 7,489,057 B2 | 2/2009 | Zhou et al. |
| 2003/0193256 A1 * | 10/2003 | Liebermann ............ H02K 9/22 310/194 |
| 2008/0093850 A1 * | 4/2008 | Taneja .................... F01D 15/10 290/36 R |
| 2011/0133579 A1 * | 6/2011 | Vanderzyden ........... H02K 1/24 310/43 |
| 2012/0104884 A1 * | 5/2012 | Wagner .................... H02K 1/32 310/54 |
| 2013/0015729 A1 * | 1/2013 | Birdi ........................ H02K 9/19 310/54 |
| 2013/0207395 A1 * | 8/2013 | Huang .................... H02K 9/19 290/46 |

* cited by examiner

*Primary Examiner* — Julio C. Gonzalez
*Assistant Examiner* — Maged M Almawri
(74) *Attorney, Agent, or Firm* — McGarry Bair PC

(57) ABSTRACT

A rotor assembly for an electric machine includes a core having at least one post and a cap wherein electrical windings are wound about the rotor assembly to define a pole. The rotation of the rotor and rotor pole relative to a stator generates a current supplied from the electric machine to a power consuming device.

13 Claims, 6 Drawing Sheets

Figure 1:
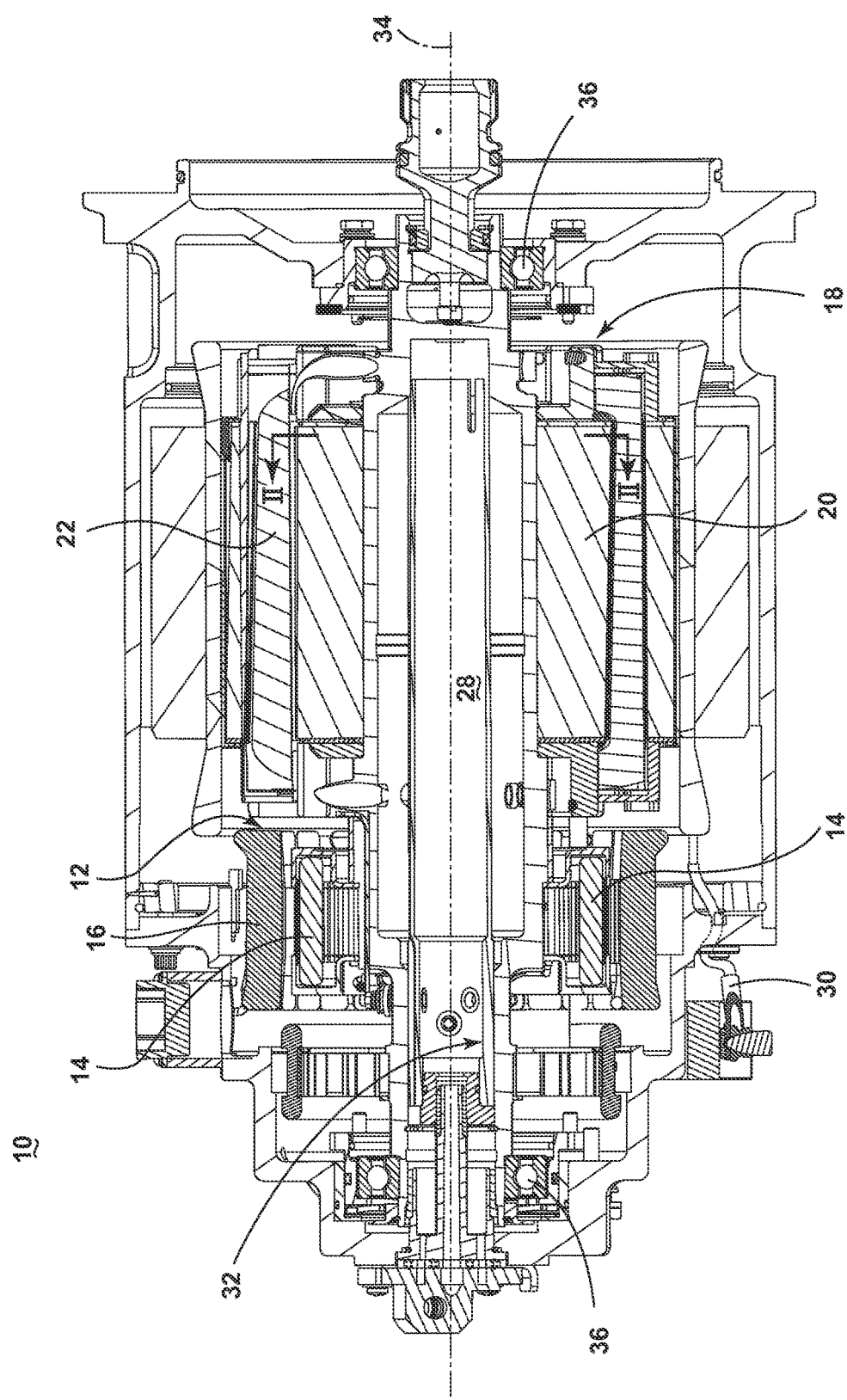

ROTOR ASSEMBLY AND COOLING ARRANGEMENT FOR AN ELECTRIC MACHINE

BACKGROUND OF THE INVENTION

Electric machines, such as electric motors and/or electric generators, are used in energy conversion. In the aircraft industry, it is common to find an electric motor having a combination of motor and generator modes, where the electric machine, in motor mode, is used to start an aircraft engine, and, depending on the mode, functions as a generator, too, to supply electrical power to the aircraft systems. Regardless of the mode, the machines typically include a rotor having main windings that are driven to rotate by a source of rotation, such as a mechanical or electrical machine, which for some aircraft may be a gas turbine engine.

BRIEF DESCRIPTION OF THE INVENTION

In one embodiment, the invention relates to a rotor assembly for an electric machine including a rotor core having a rotatable shaft having hollow interior defining a coolant conduit and at least one post defining a winding pole, a winding wound around the pole and having an end portion extending axially beyond the post to define an end turn segment, and a coolant manifold supported by the shaft and fluidly coupled to the coolant conduit, the manifold having at least a portion in a thermally conductive relationship with at least a portion of the end turn segment, wherein heat from the end turn segment is transferred by conduction to the at least a portion of the coolant manifold.

In another embodiment, the invention relates to an electric motor including a cavity housing a rotor assembly and a stator, the rotor assembly further including a rotor core having at least one post at least partially defining a first face of a winding seat, at least one coolant manifold at least partially defining a second face of the winding seat, at least one coolant tube at least partially defining a second face of the winding seat, and a winding wound around the post and at least partially supported by the winding seat, wherein the winding includes at least one side segment extending axially along the post and at least one end turn segment extending axially beyond the post. A portion of the at least one coolant manifold is in a thermally conductive relationship with at least a portion of the end turn segment and the at least one coolant tube is in a thermally conductive relationship with at least a portion of the side segment.

BRIEF DESCRIPTION OF THE DRAWINGS

In the drawings:

FIG. 1 is a sectional view of an electric machine capable of operation as a starter/generator and having a rotor assembly.

FIG. 2 is a partial perspective view of a rotor assembly, according to an embodiment of the invention.

FIG. 3 is a perspective view of the cooling system, according to an embodiment of the invention.

FIG. 4 is a cross-sectional view of the rotor assembly of FIG. 2, according to an embodiment of the invention.

FIG. 5 is a cross-sectional view of the rotor assembly and coolant manifold of FIG. 3 sectioned along line 5-5 of FIG. 4, according to an embodiment of the invention.

FIG. 6 is a cross-sectional view of the rotor assembly of FIG. 4 sectioned along line 6-6 of FIG. 4, according to an embodiment of the invention.

DESCRIPTION OF EMBODIMENTS OF THE INVENTION

While embodiments of the invention may be implemented in any environment using synchronous electric machine or main machine, a specific example of which is a dry-cavity electric motor or generator. The generator is currently contemplated to be implemented in a jet engine environment. Embodiments of the invention may alternatively include a starter/generator and may provide turbine engine starting capabilities, wherein the starter/generator provides the mechanical power to drive the turbine engine through a starting method. A brief summary of the contemplated generator environment should aid in a more complete understanding.

FIG. 1 illustrates a dry-cavity electric machine assembly 10 mounted on or within a gas turbine aircraft engine. The gas turbine engine may be a turbofan engine, such as a General Electric GEnx or CF6 series engine, commonly used in modern commercial and military aviation or it could be a variety of other known gas turbine engines such as a turboprop or turboshaft.

The electrical machine assembly 10 comprises a first machine 12 having an exciter rotor 14 and an exciter stator 16, and a synchronous second machine 18 having a main machine rotor 20 and a main machine stator 22. At least one power connection is provided on the exterior of the electrical machine assembly 10 to provide for the transfer of electrical power to and from the electrical machine assembly 10. Power is transmitted by this power connection, shown as an electrical power cable 30, directly or indirectly, to the electrical load and may provide for a three phase with a ground reference output from the electrical machine assembly 10.

The electrical machine assembly 10 may further comprises a rotatable shaft 32 mechanically coupled to a source of axial rotation, which may be a gas turbine engine, about an axis of rotation 34. The rotatable shaft 32 is supported by spaced bearings 36. The exciter rotor 14 and main machine rotor 20 are mounted to the rotatable shaft 32 for rotation relative to the stators 16, 22, which are rotationally fixed within the electrical machine assembly 10. The stators 16, 22 may be mounted to any suitable part of a housing portion of the electrical machine assembly 10. The rotatable shaft 32 is configured such that mechanical force from a running turbine engine provides rotation to the shaft 32. Alternatively, in the example of a starter/generator, rotation of the rotatable shaft 32 of the electrical machine assembly 10 during a starting mode produces a mechanical force that is transferred through the shaft 32 to provide rotation to the turbine engine.

The rotatable shaft 32 may be hollow, and further include a central coolant passage, or coolant conduit 28 extending axially along the interior of the shaft 32. The coolant conduit 28 allows coolant, for example, oil or air, to flow through the interior of the rotatable shaft 32. In the illustrated embodiment, the second machine 18 is located in the rear of the electric machine assembly 10 and the first machine 12 is positioned in the front of the electric machine assembly 10. Other positions of the first machine 12 and the second machine 18 may be included.

FIG. 2 illustrates a partial perspective view of the main machine rotor assembly 40 with some structural elements of the assembly 40 removed to provide a better view. The rotor assembly 40 is shown comprising a core 42 having at least one post 44 extending radially from the core 42, about which a rotor winding 46 may be wound to define a winding pole 48 for the assembly 40. The rotor windings 46 are shown in dashed line to better view additional aspects of the rotor assembly 40. The core 42 may be, for instance, molded, formed, or bored from a non-laminated or non-lamination, solid or unitary body material, or a plurality of laminations. One such example of a core body material may be steel. Another such example of a plurality of laminations may include cobalt laminations. Alternate body materials and formations of the core 42 may be included, for instance, using additive manufacturing. While a four pole 48 rotor assembly 40 is described having at least one rotor winding 46, alternative rotor assemblies 40 may be included having a different number of poles 48.

Each pole 48 of the rotor assembly 40 further comprises a cap 52, at least partially overlaying each post 44, pole 48, and rotor winding 46. Each cap 52 may be formed or comprised by a plurality of laminations, for instance, cobalt laminations, and/or it may be integrally formed with the core 42. In this instance, cobalt laminations may comprise the cap 52 due to its high magnetic and electrical resistance properties, and thus, its ability to minimize eddy currents at the surface of each pole 48. Cobalt laminations are merely one example of a material used to construct the cap 52, and alternate material composition or compositions may be included.

Each rotor winding 46, while continuous, can be thought of as having axial segments 49 that run along opposite sides of the pole, with opposing end turn segments 50 on opposite ends of the rotor core 42 connecting the axial segments 49. The end turn segments 50 can be thought of as the portion of the winding that extends beyond the ends of the pole 48 and/or post 44. While only one example of a single rotor winding 46 is illustrated, embodiments of the invention may include having multiple sets or rotor windings configured about one or more posts 44.

Figure 2:
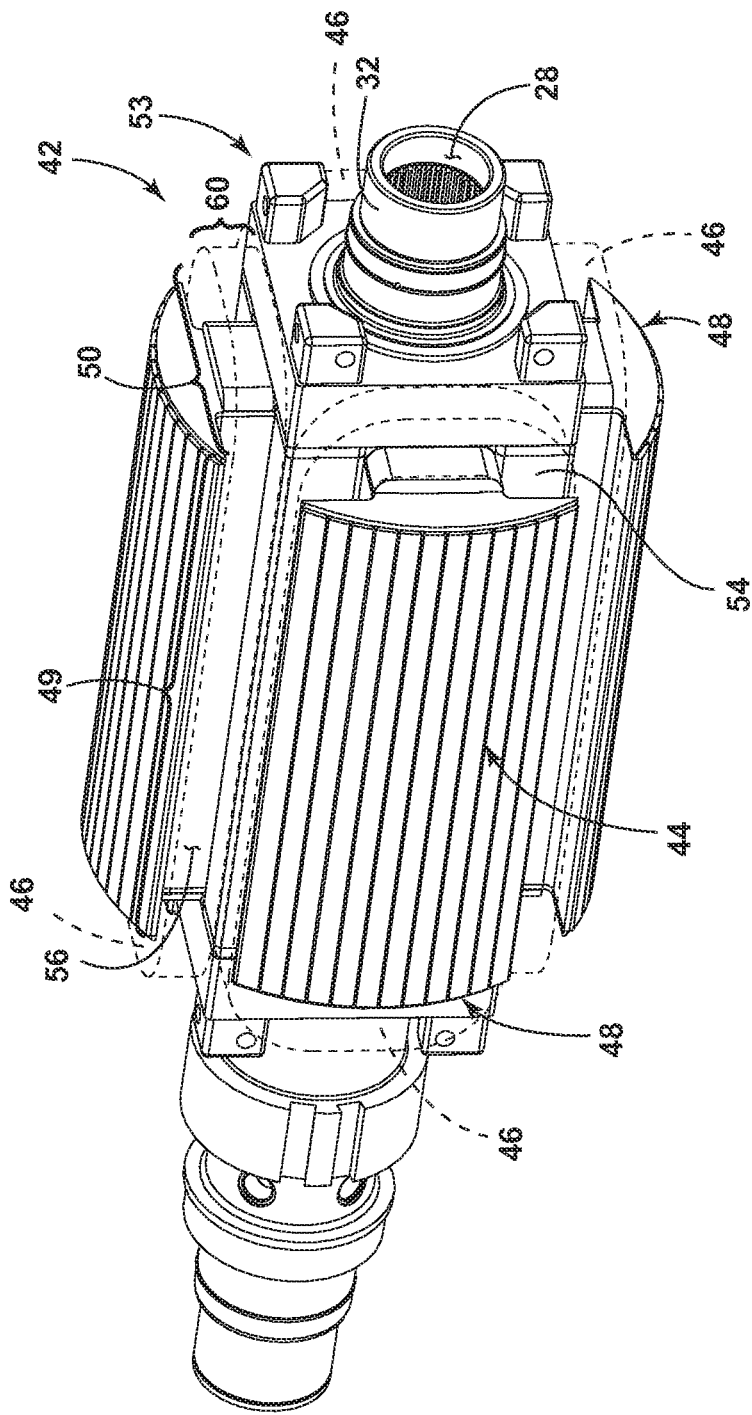
Figure 3:
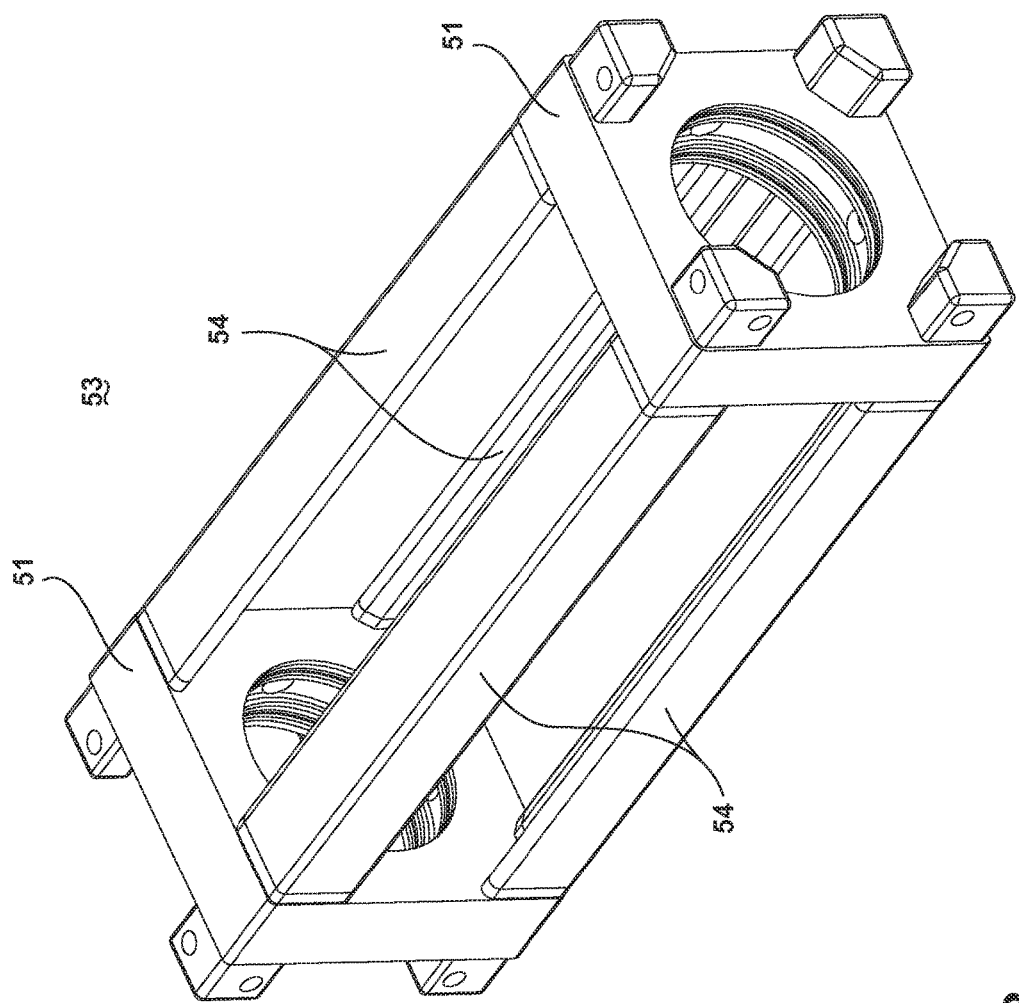

The rotor assembly 40 may further include at least one cooling system 53 supported by the rotatable shaft 32 and fluidly coupled with the coolant conduit 28. At least a portion of the cooling system 53 may extend axially along at least a portion of the rotor assembly 40, and may be positioned proximate to at least a portion of the rotor windings 46. As illustrated, the post 44 at least partially defines a first face 56 for receiving at least a portion of the axial segment 49 of the rotor windings 46. FIG. 3 illustrates a perspective view of the cooling system 53 of the rotor assembly 40 in FIG. 2. As shown, the cooling system 53 may further include at least one coolant manifold 51, supported by the rotatable shaft 32 and fluidly coupled with the coolant conduit 28 (not shown), and at least one coolant tube 54 fluidly coupled with the at least one manifold 51, and extending in the axial direction. Collectively, the coolant manifolds 51 and the coolant tubes 54 may define a cooling "cage" structure, supported by the rotatable shaft 32 and the core 42. The coolant manifold 51 and coolant tubes 54 may be, for example, molded or formed out of a thermally conductive material, such as aluminum. Additional thermally conductive materials and manufacturing techniques of the coolant manifold 51 and coolant tubes 54 may be included.

Figure 4:
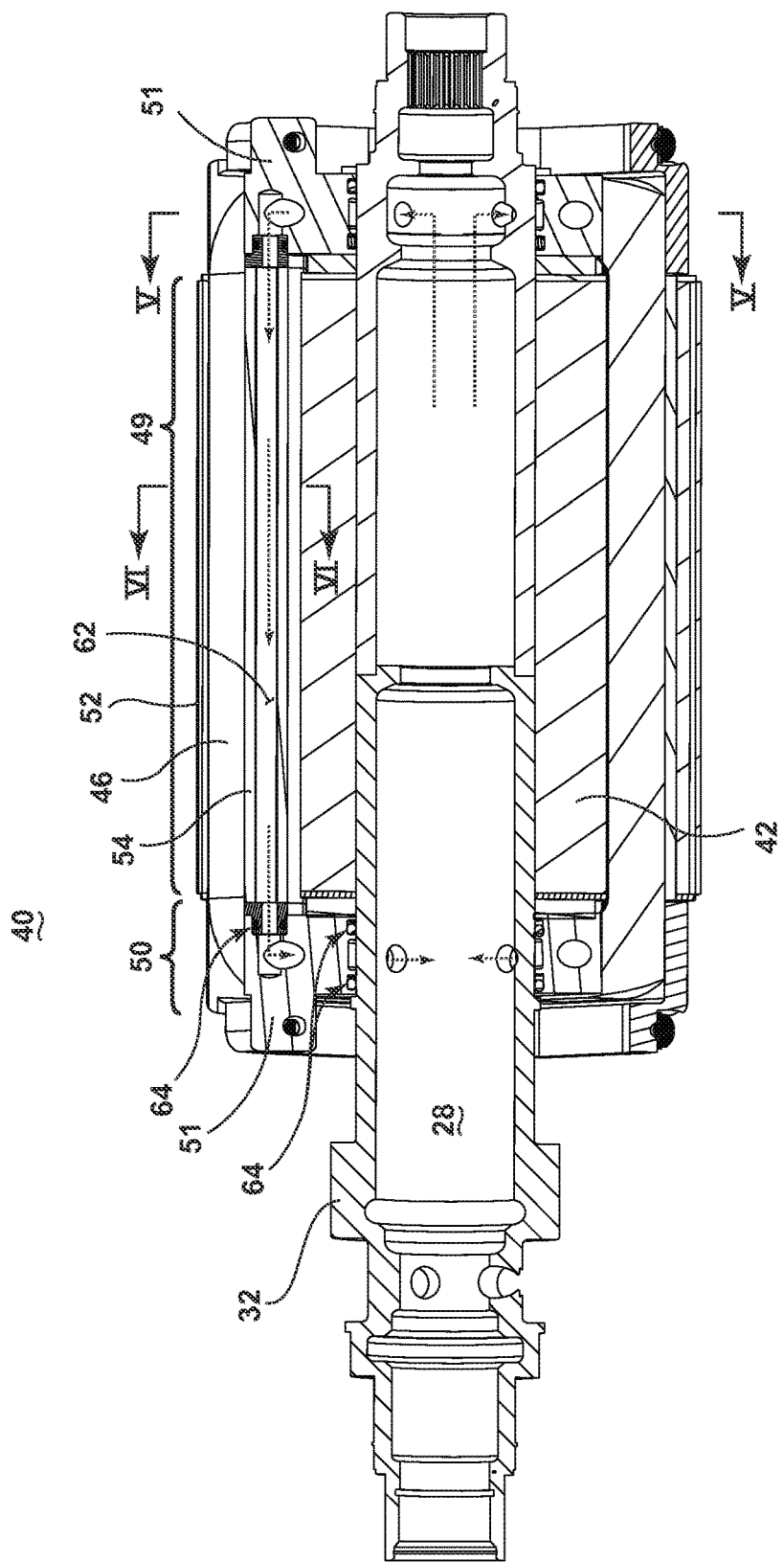

FIG. 4 illustrates a cross-sectional view of the rotor assembly 40 at an angle showing an axial cross section of one cooling tube 54. Embodiments of the invention, like that shown, may include a coolant manifold 51 on each opposite end of the rotor core 42, and a plurality of coolant tubes 54 fluidly coupling the manifolds 51. The coolant tube 54 extends axially along at least a portion of the rotor assembly 40 and comprises a fluid passageway 62 extending between opposing coolant manifolds 51. Each of the coolant tubes 54 and/or the coolant manifolds 51 may be further configured to fluidly couple with the manifolds 51 and rotatable shaft 32, respectively, such that fluid does not leak from the rotor assembly 40 into the dry cavity of the electric machine. For example, each of the coolant tubes 54 and/or the coolant manifolds 51 may include one or more O-rings 64 to provide liquid-tight coupling. As illustrated by dotted arrows, a coolant loop or path may be at least partially defined by coolant traversing from the coolant conduit 28 radially outward through one of the opposing coolant manifolds 51, axially along at least one of the coolant tubes 54, and return to the coolant conduit 28 via the opposing manifold 51.

Figure 5:
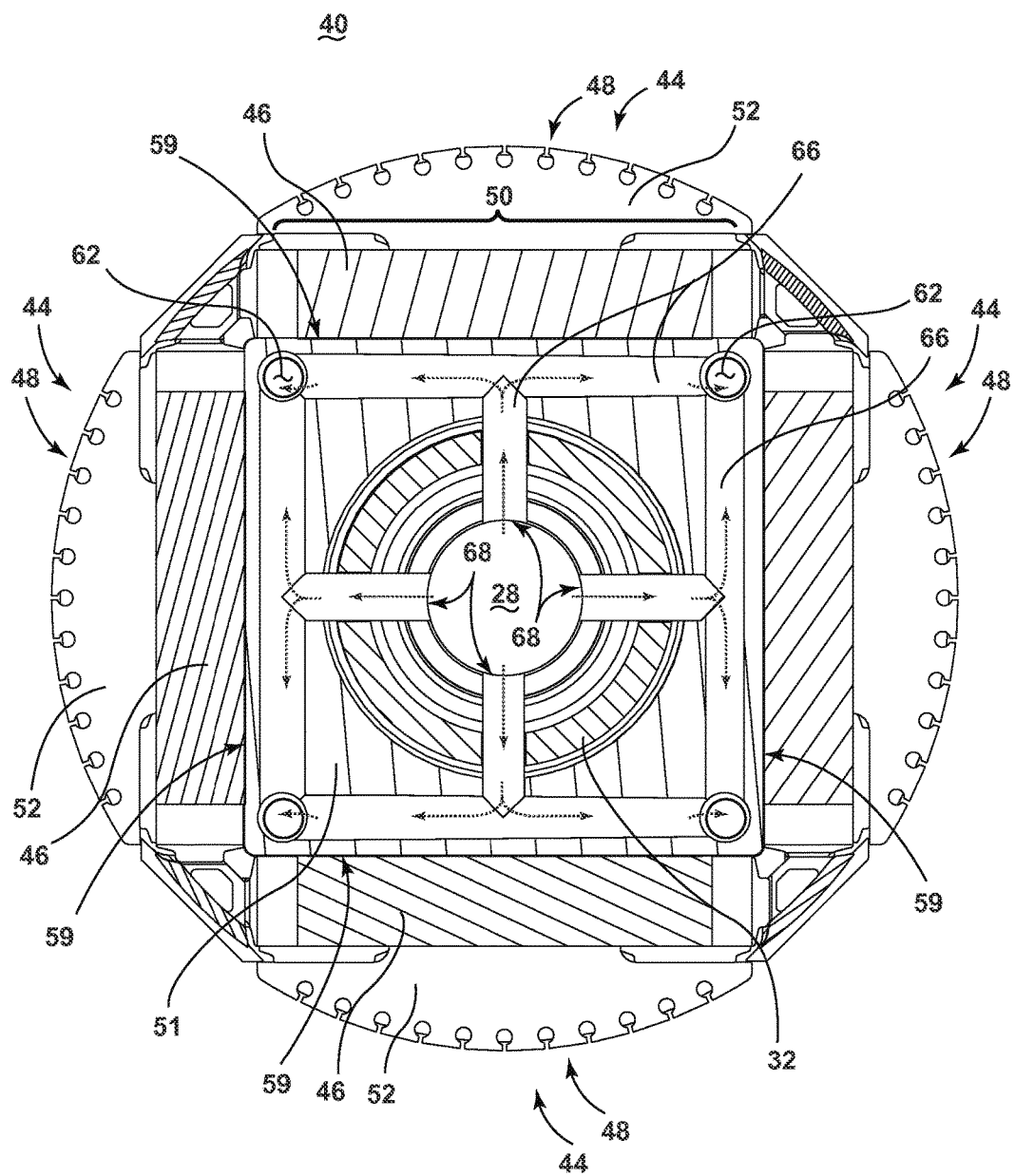

FIG. 5 shows a cross-sectional view of the rotor assembly 40 and coolant manifold 51, sectioned along line 5-5 of FIG. 4. The coolant manifold 51 further at least partially defines at least one second face 59 located adjacent to, and receiving at least a portion of a corresponding end turn segment 50 of the windings 46. The second face 59 of the coolant manifolds 51 may also partially extend with a portion of an axial segment 49 of the rotor winding 46. In this sense, each coolant manifold 51 includes at least a portion of one face 59 in a thermally conductive relationship, or thermal contact, with a corresponding portion of an end turn segment 50 of the rotor winding 46.

The coolant manifold 51 further comprises a series of manifold passageways 66 extending from the interface of the manifold 51 and rotatable shaft 32, and radially aligned with access openings 68 of the shaft 32, such that the manifold passageways 66 and coolant conduit 28 are fluidly coupled. Coolant that traverses or is pumped through the coolant conduit 28 may thus traverse through the access openings 68, through the manifold passageways 66, and into the passageways 62 of the coolant tube 54. While only a one coolant manifold 51 is shown and described as receiving coolant from the coolant conduit 28, each manifold 51 may be similarly configured such that the opposing manifold 51 may receive the coolant from the passageways 62 of the coolant tube 54, receive the coolant through the manifold passageways 66, and provide the coolant to the coolant conduit 28 via the access openings 68. In this sense, the coolant tubes 54, radial manifold passageways 66, and coolant conduit 28 at least partially define a coolant loop or path (illustrated by dotted arrows) wherein coolant may fluidly traverse, flow, or be forcibly pumped from the coolant conduit 28, through the access openings 68 and corresponding manifold passageways 66 of one of the opposing manifolds 51. The coolant may further traverse through the coolant tubes 54, and returned to the coolant conduit 28 through the other of the corresponding manifolds 51. Alternative flows, paths, and loops of the coolant through the coolant tubes 54, manifolds 51, and coolant conduit 28 may be included. The coolant traversing the coolant path may, for example, remove heat from at least one of the coolant tubes 54 and/or coolant manifolds 51 via convection.

As shown, the end turn segments 50 of the windings 46 are in a thermally conductive relationship or thermal contact with the manifold 51 such that heat from the end turn segment 50 may be transferred, for example by conduction, to at least a portion of the coolant manifold 51. The coolant manifold 51 may further transfer heat to coolant traversing the manifold passageways 66. In the illustrated example, a four pole rotor assembly 40 may include multiple end turn segments 50, with at least a portion of each or fewer than all segments 50 in thermal contact with multiple sides or faces of the coolant manifold 51. As shown, the manifold 51 is in thermal contact with at least a portion of each of the end turn segments 50. While the opposing coolant manifold 51 is not shown, embodiments may include a substantially similar configuration such that the at least a portion of at each or fewer than all opposing end turn segments 50 are also in thermal contact with the opposing manifold 51. Embodiments of the invention may further include, for example, end turn supports to structurally hold the end turn segments 50 against the manifold 51 during rotation of the rotor assembly 40 to ensure an effective thermal contact between the segments 50 and manifold 51.

Figure 6:
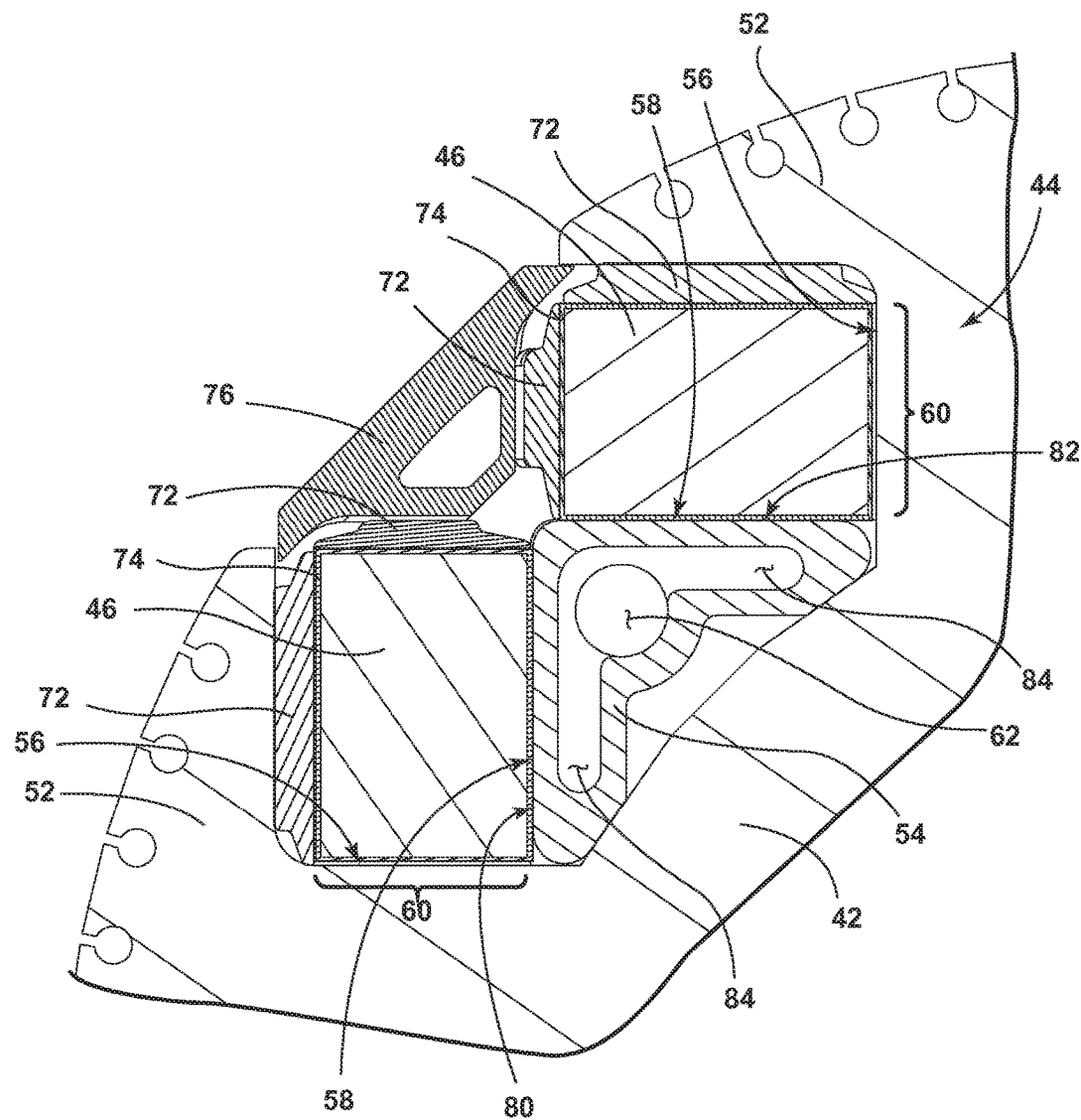

Turning now to FIG. 6, one embodiment of the coolant tube 54 and rotor winding 46 interface is illustrated. The post 44 at least partially defines the first face 56 for receiving the rotor windings 46 and the at least one coolant tube 54 at least partially defines a third face 58 for receiving at least a portion of the axial segment 49 of the rotor windings 46. Collectively, the faces 56, 58, 59 and cap 52 may at least partially define an axially extending winding seat 60 or slot for receiving and/or supporting the rotor winding 46. The third face 58 of the coolant tubes 54 may partially extend with a portion of the end turn segments 50. In this sense, each coolant tube 54 includes at least a portion of one face 58 in a thermally conductive relationship, or thermal contact, with a corresponding portion of an axial segment 49 of the rotor winding 46.

At least one of the winding seat 60 and/or the rotor windings 46, may further comprise at least a thermally conductive layer provided for separating the rotor windings 46 from the coolant tube 54. As shown, the interface may comprise a thermally conductive, electrically insulating slot liner 74 configured about the rotor windings 46. The configuration of the slot liner 74 is arranged to physically separate the windings 46 from the post 44, cap 52, and/or coolant tube 54.

The slot liner 74 is configured to provide a thermally conductive relationship between the rotor windings 46 and the coolant tubes 54 such that the slot liner 74 is capable of conducting heat from the windings 46 to the coolant tubes 54 via conduction; however, additional functionality may be included, such as electrical isolation of the windings 46 from additional components, or from additional windings 46. Also shown are wedges 72, and a restraining element 76 which may bias the windings 46 toward the coolant tubes 54 to ensure a reliable thermal contact during rotation of the rotor assembly 40. For example, a wedge 72 may be configured between the cap 52 and rotor windings 46 to bias the winding 46 away from the cap 52 and toward the coolant tube 54, while a second wedge 72 is configured between the restraining element 76 and the post 44 to bias the winding 46 away from the restraining element 76 and into the winding seat 60. In the illustrated example, the restraining element 76 is secured in place between respective cap 52 ends. The slot liner 74, wedges 72, and restraining element 76 are merely one non-limiting example of a configuration of the rotor windings 46 relative to the post 44 and coolant tubes 54, and alternative configurations with more or fewer of the above-mentioned elements may be included. Furthermore, embodiments of the invention may include a slot liner 74 that extends about all portions of the winding, including the end turn segments 50.

The cross section of the coolant tube 54 further illustrates a first face 80 and a second face 82 of the coolant tube 54. The coolant tube 54 may also include auxiliary coolant passages 84 fluidly coupled with the passageways 62 of the coolant tube 54, and configured to spread the coolant traversing the coolant tube 54 over a larger surface area proximate to at least one of the first face 80 and/or second face 82. In this sense, the coolant traversing the auxiliary passages 84 and passageways 62 of the coolant tube 54 may effectively remove more heat from either of the first and/or second faces 80, 82 during operation. The cross-sectional area of the auxiliary passages 84 may be, for example, configured based on the expected flow rate and/or amount of coolant pumped through the coolant loop, or may be configured based on the thermal removal requirements of the rotor assembly 40. Additionally, alternative geometric configurations of the coolant tube 54, passageways 62, and/or auxiliary passages 84 may be included.

This configuration provides that a single coolant tube 54 may provide the first face 80 in thermal contact with a first winding 46 and the second face 82 in thermal contact with a second winding 46. Thus, in a four pole rotor assembly 40, four coolant tubes 54 may be in thermal contact with, respectively, axial segments 49 of two different windings 46. The coolant tube 54 is also shown in thermal contact with the rotor core 42. Additional configurations may be included to provide for increased thermal conduction, or increased surface area contact, between the rotor windings 46 and the coolant tubes 54. For example, embodiments of the invention may be included wherein, for example, thermal fins in conductive contact with the windings 46 may be configured to confront an additional face of the coolant tube 54. While only a single cross-sectional area is shown, embodiments may include the thermally conductive layer extending along at least a portion of the axial segments 49 of the rotor windings 46, as well as at least a portion of the length of the end turn segments 50, and provides for similar increased thermal conduction, or increased surface area contact, between the windings 46 and the coolant manifold 51.

Alternative thermally conductive layer formations and assemblies may be included, such as adhesion by glue, mechanical fastening, etc., to provide for a thermally conductive relationship between the windings 46 and the coolant tubes 54. For example, the thermally conductive layer may be, formed by a thermally conductive coating applied to the winding seat 60 and confronting the coolant tube 54. Additionally, embodiments of the invention may include a thermally conductive relationship comprising an air gap between the rotor windings 46 and the coolant tubes 54, as well as embodiments wherein the thermally conductive relationship does not include an air gap between the windings 46 and tube 54.

During electrical machine 10 operation, the rotor assembly 40 is rotated about the axis of rotation 34 by a mechanical force, such as a turbine engine, coupled with the rotatable shaft 32. During rotation, the rotor windings 46 and end turn segments 50 are energized to create an energized pole 48 from, for example, DC power from a rectified AC power output of the exciter rotor 14. The rotation of the pole 48 relative to the main machine stator 22 generates a power output, such as an AC power output, which is then transmitted by the electrical power cable 30 to an electrical system, for instance, a power distribution node.

The DC current transmitted through the energized rotor windings 46 and end turn segments 50 generates heat in the windings 46 and segments 50. The heat generated in the rotor windings 46 and end turn segments 50 is thermally conducted away from the windings 46 via the thermally conductive layer, such as the slot liner 74, to the coolant tubes 54 that underlay the axial segments 49 of the windings 46, and the coolant manifold 51 that underlay the end turn segments 50 of the windings 46. The rotor assembly 40 is further configured to remove heat conducted to the manifolds 51 and coolant tubes 54 via coolant traversing through the above described coolant paths and loops.

As the rotor assembly 40 rotates at the anticipated high rotations per minute (RPMs), the centrifugal forces tend to push the rotor windings 46 radially outward, but the windings 46 are fixed in place by, for example, the wedges 72 and restraining element 76, which in turn, ensures a firm thermal conduction interface with the windings 46. Additionally, the collective configuration of the cap 52 and post 44 of the rotor assembly 40 tend to oppose the centrifugal forces on the rotor windings 46, and help improve the thermal transfer from the windings 46 to the coolant via conduction, by ensuring the winding 46 stays in place and in contact with the tubes 54 and/or thermally conductive layer.

Many other possible embodiments and configurations in addition to that shown in the above figures are contemplated by the present disclosure. For example, one embodiment of the invention contemplates more or fewer of the electrical machine assembly 10 components mentioned, such as poles 48, caps 52, rotor windings 46, etc. Additionally, the design and placement of the various components may be rearranged such that a number of different in-line configurations could be realized.

The embodiments disclosed herein provide a rotor assembly for an electric machine. One advantage that may be realized in the above embodiments is that the above described embodiments have significantly improved thermal conduction to remove heat from the assembly. The improved thermal conductivity between the rotor windings and the coolant tubes coupled with the coolant paths and/or loops provide for heat removal in a much more effective fashion from the windings to the coolant. Additionally, the thermal contact of the manifold along the end turn segments of the rotor windings provides increased thermal conductivity between the windings and the coolant. Another advantage of the above embodiments if that a higher level of power generation may be achieved without having to use a wet-cavity configuration.

Yet another advantage of the above embodiments is that the thermally conductive layer provides improved mechanical integrity, along with improved thermal conductivity. The thermally conductive layer, as described, may also provide for a plurality of faces in thermal conduction with the faces of the coolant tubes and manifolds, providing even yet improved thermal conductivity and thus, a more effective heat removal from the windings to the coolant. The increased thermal dissipation of the rotor assembly allows for a higher speed rotation, which may otherwise generate too much heat. The higher speed rotation may result in improved power generation or improved generator efficiency without increasing generator size. The described embodiments are also capable of cooling the windings and end turn segments which further reduces thermal losses created in the rotor. Reduced thermal losses in the windings allow for greater efficiency and greater power density of the generator.

When designing aircraft components, important factors to address are size, weight, and reliability. The above described rotor assemblies have a decreased number of parts, making the complete system inherently more reliable. This results in possibly a lower weight, smaller sized, increased performance, and increased reliability system. The lower number of parts and reduced maintenance will lead to a lower product costs and lower operating costs. Reduced weight and size correlate to competitive advantages during flight.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor assembly for an electric machine comprising:
    a rotor core having a rotatable shaft having hollow interior defining a coolant conduit and at least one post defining a winding pole;
    a winding wound around the pole, and having axial segments that extend axially along the pole and end turn segments that extend axially beyond ends of the post;
    a coolant manifold supported by the shaft and sealed from the winding but fluidly coupled to the coolant conduit wherein coolant can move between the coolant manifold and the coolant conduit, the coolant manifold having a thermally conductive face radially underlying at least a portion of the end turn segment and in thermal contact with the portion of an end turn segment, wherein heat from the end turn segment is transferred by conduction through the thermally conductive face of the coolant manifold to coolant in the coolant manifold; and
    at least one coolant tube in fluid communication with the coolant manifold and extending axially along the post, wherein the coolant tube comprises a first thermally conductive face radially underlying, in thermal contact with, and at least partially supporting, an axial segment of a first winding and a second thermally conductive face radially underlying, in thermal contact with, and at least partially supporting, an axial segment of a second winding.

2. The rotor assembly of claim 1 further comprising a coolant manifold on opposite ends of the rotor core, with each of the coolant manifolds having a thermally conductive face in thermal contact with a corresponding one of the end turn segments.

3. The rotor assembly of claim 1 wherein heat from the axial segment is transferred by conduction through the thermally conductive face of the coolant tube to coolant in the coolant tube.

4. The rotor assembly of claim 1 further comprising a thermally conductive layer provided for separating the winding from the coolant tube.

5. The rotor assembly of claim 1 wherein the coolant manifold is in thermal contact with at least a portion of multiple end turn segments.

6. The rotor assembly of claim 1 further comprising a thermally conductive layer provided for separating the winding from the coolant manifold.

7. The rotor assembly of claim 6 wherein the thermally conductive layer is a coating applied to the winding.

8. The rotor assembly of claim 1 further comprising a cooling cage defined by opposing coolant manifolds on opposite ends of the rotor core, and at least one coolant tube fluidly coupling the manifolds adjacent an axial segment away from the pole, wherein the axial segment is in thermal contact with at least one coolant tube.

9. The rotor assembly of claim 8 further comprising four poles.

10. The rotor assembly of claim 9 further comprising four coolant tubes.

11. The rotor assembly of claim 10 wherein each coolant tube comprises a first thermally conductive face in thermal contact with a first winding and a second thermally conductive face in thermal contact with a second winding.

12. An electric motor comprising:
- a cavity housing a rotor assembly and a stator;
- the rotor assembly defining an axis of rotation and comprising:
  - a rotor core having a first post defining a first face of a first winding seat, and a second post defining a first face of a second winding seat;
  - a coolant tube at least partially defining a second face of the first and second winding seats;
  - at least one coolant manifold at least partially defining a second face of the first and second winding seats, and coupled with an axial end of the coolant tube; and
  - a first winding wound around the first post and at least partially supported by the first winding seat, wherein the first winding includes at least one first side segment extending axially along the post and at least one first end turn segment extending axially beyond the post;
  - a second winding wound around the second post and at least partially supported by the second winding seat, wherein the second winding includes at least one second side segment extending axially along the post and at least one second end turn segment extending axially beyond the post;
- wherein a portion of the at least one coolant manifold is in thermal contact with at least a radially underlying a portion of the first and second end turn segments and the coolant tube is in thermal contact with at least a radially underlying a portion of the first and second side segments away from the posts.

13. The electric motor of claim 12 wherein the cavity is a dry cavity.

* * * * *